(12) United States Patent
Rajan et al.

(10) Patent No.: US 10,108,648 B2
(45) Date of Patent: Oct. 23, 2018

(54) CREATING A CUSTOM INDEX IN A MULTI-TENANT DATABASE ENVIRONMENT

(75) Inventors: Chirag Rajan, San Francisco, CA (US); Arup Dutta, San Ramon, CA (US); John O'Brien, San Francisco, CA (US); Jaikumar Bathija, Fremont, CA (US); Greg Salmon, Walnut Creek, CA (US); Dan Soble, Pleasanton, CA (US); RamaLinga R. Penmetsa, Fremont, CA (US); Hoon Kim, Redwood City, CA (US); Yanan Jiang, Daly City, CA (US); Karthik Rajan, Foster City, CA (US); Jesse Collins, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 258 days.

(21) Appl. No.: 13/549,306

(22) Filed: Jul. 13, 2012

(65) Prior Publication Data
US 2013/0018890 A1 Jan. 17, 2013

Related U.S. Application Data

(60) Provisional application No. 61/507,292, filed on Jul. 13, 2011.

(51) Int. Cl.
*G06F 17/30* (2006.01)
(52) U.S. Cl.
CPC .. *G06F 17/30336* (2013.01); *G06F 17/30442* (2013.01); *G06F 17/30477* (2013.01)

(58) Field of Classification Search
CPC ......... G06F 17/30336; G06F 17/30321; G06F 17/30289; G06F 17/30306; G06F 17/30312
(Continued)

(56) References Cited

U.S. PATENT DOCUMENTS 5,043,872 A * 8/1991 Cheng ............... G06F 17/30336
5,577,188 A 11/1996 Zhu
(Continued)

FOREIGN PATENT DOCUMENTS

WO    WO 2006076520 A3 * 2/2007

OTHER PUBLICATIONS

Hui, Mei, Dawei Jiang, Guoliang Li, and Yuan Zhou. "Supporting database applications as a service." In Data Engineering, 2009. ICDE'09. IEEE 25th International Conference on, pp. 832-843. IEEE, 2009.*
(Continued)

*Primary Examiner* — Taelor Kim
*Assistant Examiner* — Jesse P Frumkin
(74) *Attorney, Agent, or Firm* — Jaffrey, Watson, Mendonsa & Hamilton, LLC

(57) ABSTRACT

Methods and systems are described for creating a custom index in a multi-tenant database environment. In one embodiment, a method includes obtaining query for a multi-tenant database that is recommended as a candidate for creating an additional filter, evaluating the query against criteria to determine whether to select the query for creating the additional filter, and creating the additional filter for the query, if the query is selected.

19 Claims, 11 Drawing Sheets

(58) Field of Classification Search
USPC ........................................................ 707/741
See application file for complete search history.

(56) References Cited

U.S. PATENT DOCUMENTS

| | | | |
|---|---|---|---|
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,079 | A * | 2/1999 | Davis et al. |
| 5,873,096 | A | 2/1999 | Lim et al. |
| 5,918,159 | A | 6/1999 | Fomukong et al. |
| 5,963,953 | A | 10/1999 | Cram et al. |
| 6,029,163 | A * | 2/2000 | Ziauddin ............ G06F 17/30463 |
| 6,092,083 | A | 7/2000 | Brodersen et al. |
| 6,169,534 | B1 | 1/2001 | Raffel et al. |
| 6,182,079 | B1 * | 1/2001 | Lenzie .............. G06F 17/30336 |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,178,425 | B1 | 6/2001 | Brodersen et al. |
| 6,266,669 | B1 | 7/2001 | Brodersen et al. |
| 6,272,487 | B1 | 8/2001 | Beavin et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,505,188 | B1 | 1/2003 | Ghazal et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,007,006 | B2 * | 2/2006 | Zilio et al. .................... 707/717 |
| 7,340,411 | B2 | 3/2008 | Cook |
| 7,499,907 | B2 * | 3/2009 | Brown et al. |
| 7,526,469 | B2 * | 4/2009 | Narita et al. |
| 7,620,655 | B2 | 11/2009 | Larsson et al. |
| 7,962,521 | B2 * | 6/2011 | Brown .............. G06F 17/30336 707/601 |
| 8,510,290 | B1 * | 8/2013 | Brown .............. G06F 17/30312 707/696 |
| 8,868,404 | B1 * | 10/2014 | Yancey ................... G06F 17/28 704/7 |
| 9,081,805 | B1 * | 7/2015 | Stamen ............ G06F 17/30297 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0088579 | A1 * | 5/2003 | Brown et al. ............... 707/104.1 |
| 2003/0093408 | A1 * | 5/2003 | Brown et al. ....................... 707/2 |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2003/0229639 | A1 | 12/2003 | Carlson et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0117355 | A1 * | 6/2004 | Lef et al. ........................ 707/3 |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0203940 | A1 * | 9/2005 | Farrar ............... G06F 17/30321 |
| 2005/0223022 | A1 * | 10/2005 | Weissman et al. ........... 707/102 |
| 2005/0289102 | A1 * | 12/2005 | Das et al. ......................... 707/1 |
| 2006/0235831 | A1 | 10/2006 | Adinolfi et al. |
| 2007/0073761 | A1 * | 3/2007 | Anderson et al. ............ 707/102 |
| 2007/0124276 | A1 | 5/2007 | Weissman et al. |
| 2007/0136386 | A1 * | 6/2007 | Burger ............. G06F 17/30336 |
| 2007/0271268 | A1 | 11/2007 | Fontoura et al. |
| 2008/0005092 | A1 * | 1/2008 | Kleewein et al. ................. 707/4 |
| 2008/0040320 | A1 * | 2/2008 | Dettinger et al. ................. 707/3 |
| 2008/0052271 | A1 | 2/2008 | Lam |
| 2008/0168058 | A1 * | 7/2008 | Gordon ............ G06F 17/30306 |
| 2008/0177697 | A1 * | 7/2008 | Barsness ........... G06F 17/30336 |
| 2009/0049288 | A1 | 2/2009 | Weissman |

(56) References Cited

U.S. PATENT DOCUMENTS

| | | | |
|---|---|---|---|
| 2009/0055439 A1* | 2/2009 | Pai et al. | 707/200 |
| 2009/0282045 A1 | 11/2009 | Hsieh et al. | |
| 2010/0005055 A1* | 1/2010 | An et al. | 707/2 |
| 2010/0036801 A1 | 2/2010 | Pirvali et al. | |
| 2010/0057796 A1* | 3/2010 | Brown | G06F 17/30336 707/715 |
| 2010/0114976 A1* | 5/2010 | Castellanos | G06F 17/30312 707/803 |
| 2010/0121868 A1 | 5/2010 | Biannic et al. | |
| 2010/0169354 A1 | 7/2010 | Baby et al. | |
| 2010/0174701 A1* | 7/2010 | Burger | G06F 17/30312 707/713 |
| 2010/0250504 A1* | 9/2010 | Balasubramanian | G06F 17/30336 707/696 |
| 2010/0262593 A1* | 10/2010 | Bruno | G06F 17/30312 707/715 |
| 2010/0287206 A1 | 11/2010 | Cain et al. | |
| 2010/0287214 A1 | 11/2010 | Narasayya et al. | |
| 2011/0010394 A1 | 1/2011 | Carew et al. | |
| 2011/0040744 A1 | 2/2011 | Haas et al. | |
| 2011/0055201 A1* | 3/2011 | Burger | 707/719 |
| 2011/0258179 A1* | 10/2011 | Weissman | G06F 17/30389 707/714 |
| 2011/0282839 A1* | 11/2011 | Paksoy et al. | 707/640 |
| 2012/0233147 A1* | 9/2012 | Solheim et al. | 707/709 |
| 2013/0086038 A1* | 4/2013 | Perry | 707/715 |
| 2013/0254210 A1* | 9/2013 | Morris | G06F 17/30312 707/741 |
| 2014/0188532 A1* | 7/2014 | Liu | G06F 17/30471 705/7.12 |

OTHER PUBLICATIONS

He, Hong. "Applications deployment on the SaaS platform." In Pervasive Computing and Applications (ICPCA), 2010 5th International Conference on, pp. 232-237. IEEE, 2010.*

Tovarnak, Daniel, and Toma Pitner. "Towards multi-tenant and interoperable monitoring of virtual machines in cloud." In Symbolic and Numeric Algorithms for Scientific Computing (SYNASC), 2012 14th International Symposium on, pp. 436-442. IEEE, 2012.*

A Method and System to Enhance Query Performance by Autonomically Creating and Deleting Database Indices at Runtime. IBM. Published Sep. 24, 2003. IP.com No. IPCOM000019661D.*

Final Office Action for U.S. Appl. No. 12/897,276 dated Apr. 1, 2015, 12 pages.

Final Office Action for U.S. Appl. No. 12/897,276 dated Aug. 8, 2012, 11 pages.

Final Office Action for U.S. Appl. No. 12/897,276 dated Jul. 15, 2016, 9 pages.

Non-Final Office Action for U.S. Appl. No. 12/971,978 dated Jan. 14, 2013, 17 pages.

Non-Final Office Action for U.S. Appl. No. 12/897,276 dated Dec. 18, 2013, 8 pages.

Non-Final Office Action for U.S. Appl. No. 12/897,276 dated Feb. 21, 2012, 8 pages.

Non-Final Office Action for U.S. Appl. No. 12/897,276 dated Jan. 23, 2018, 17 pages.

Non-Final Office Action for U.S. Appl. No. 12/897,276 dated Jul. 7, 2017, 15 pages.

Non-Final Office Action for U.S. Appl. No. 12/897,276 dated May 22, 2014, 8 pages.

Non-Final Office Action for U.S. Appl. No. 12/897,276 dated Nov. 30, 2016, 8 pages.

Non-Final Office Action for U.S. Appl. No. 12/897,276 dated Nov. 6, 2015, 10 pages.

Non-Final Office Action for U.S. Appl. No. 12/897,276 dated Sep. 10, 2014, 8 pages.

Notice of Allowance for U.S. Appl. No. 12/971,978 dated Jul. 8, 2013, 11 pages.

Final Office Action for U.S. Appl. No. 12/897,276 dated Jun. 25, 2018, 16 pages.

* cited by examiner

*FIG. 1A*
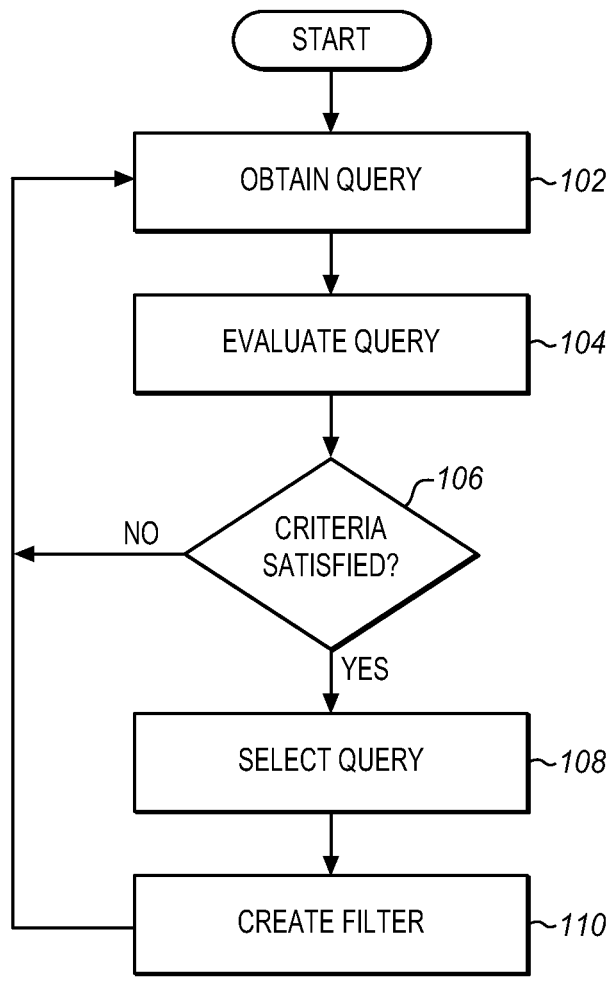
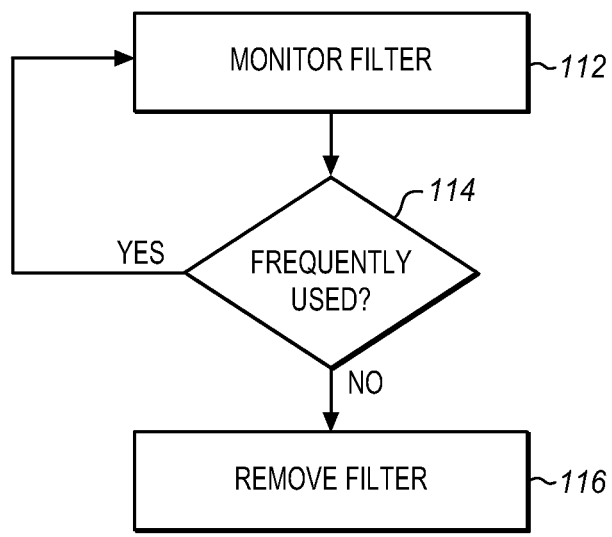

| tenant_id | email_id | to_address | from_address | date | subject | body | size | status |
|---|---|---|---|---|---|---|---|---|
| 1 | 1 | jesse@email.com | a@yahoo.com | 1/1/2010 | Meeting | blah blah blah.... | 342 | 0 |
| 2 | 2 | someone@othercompany.com | b@yahoo.com | 1/17/2010 | news | blah blah blah.... | 342 | 0 |
| 3 | 3 | jim@news.com | c@yahoo.com | 2/20/2010 | news | blah blah blah.... | 342 | 0 |
| 1 | 4 | jesse@email.com | d@yahoo.com | 6/6/2009 | birthday | blah blah blah.... | 342 | 0 |
| 1 | 5 | jesse@email.com | e@yahoo.com | 5/5/2010 | discount | blah blah blah.... | 342 | 0 |
| 2 | 6 | someone@othercompany.com | f@yahoo.com | 7/4/2009 | hello | blah blah blah.... | 342 | 0 |
| 1 | 7 | jesse@email.com | g@yahoo.com | 1/3/2009 | big customer | blah blah blah.... | 342 | 0 |
| 1 | 8 | jane@email.com | h@yahoo.com | 3/4/2010 | meeting | blah blah blah.... | 342 | 0 |
| 1 | 9 | jesse@email.com | i@yahoo.com | 4/1/2009 | meeting | blah blah blah.... | 342 | 0 |

*FIG. 4A*

| tenant_id 401 | entity 404 | index number 406 | val1 432 | val2 452 | primary key 422 |
|---|---|---|---|---|---|
| 1 | email | 2 | jane@email.com | 3/4/2010 | 8 |
| 1 | email | 2 | jesse@email.com | 1/3/2009 | 7 |
| 1 | email | 2 | jesse@email.com | 4/1/2009 | 9 |
| 1 | email | 2 | jesse@email.com | 6/6/2009 | 4 |
| 1 | email | 2 | jesse@email.com | 1/1/2010 | 1 |
| 1 | email | 2 | jesse@email.com | 5/5/2010 | 5 |
| 2 | email | 2 | jim@news.com | 2/20/2010 | 3 |
| 2 | email | 2 | someone@othercompany.com | 7/4/2009 | 6 |
| 3 | email | 2 | someone@othercompany.com | 1/17/2010 | 2 |

FIG. 4B

| tenant_id | entity | index number | val1 | val2 | primary key |
|---|---|---|---|---|---|
| 1 | email | 2 | jane@email.com | 3/4/2010 | 8 |
| 1 | email | 2 | jesse@email.com | 1/3/2009 | 1 |
| 1 | email | 2 | jesse@email.com | 4/1/2009 | 4 |
| 1 | email | 2 | jesse@email.com | 6/6/2009 | 5 |
| 1 | email | 2 | jesse@email.com | 1/1/2010 | 7 |
| 1 | email | 2 | jesse@email.com | 5/5/2010 | 9 |
| 2 | email | 2 | jim@news.com | 2/20/2010 | 3 |
| 2 | email | 2 | someone@othercompany.com | 7/4/2009 | 2 |
| 3 | email | 2 | someone@othercompany.com | 1/17/2010 | 6 |

FIG. 5A

| tenant_id | entity | index number | val1 | val2 | primary key |
|---|---|---|---|---|---|
| 1 | email | 2 | jesse@email.com | 5/5/2010 | 9 |

FIG. 5B

| tenant_id | email_id | to_address | from_address | date | subject | body | size | status |
|---|---|---|---|---|---|---|---|---|
| 1 | 5 | jesse@email.com | e@yahoo.com | 5/5/2010 | discount | blah blah blah.... | 342 | 0 |

CREATING A CUSTOM INDEX IN A MULTI-TENANT DATABASE ENVIRONMENT

CLAIM OF PRIORITY

This application claims the benefit of U.S. Provisional Patent Application No. 61/507,292 entitled Custom Index Creator, by Rajan et al., filed Jul. 13, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 12/971,978 entitled METHODS AND SYSTEMS FOR DETERMINING CANDIDATES FOR A CUSTOM INDEX IN A MULTI-TENANT DATABASE ENVIRONMENT, by Collins et al., filed Dec. 17, 2010, issued as U.S. Pat. No. 8,583,653 on Nov. 12, 2013.

U.S. patent application Ser. No. 12/897,276 entitled METHODS AND SYSTEMS FOR PROVIDING MULTIPLE COLUMN CUSTOM INDEXES IN A MULTI-TENANT DATABASE ENVIRONMENT, by Collins et al., filed Oct. 4, 2010.

FIELD OF THE INVENTION

The current invention relates generally to creating custom indexes to support queries from users or developers in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The reliable and efficient operation of queries on the database system to deliver information to a user has been and continues to be a goal of administrators of database systems.

Unfortunately, conventional database approaches might process a query relatively slowly if, for example, the query is inartfully drafted or the data is not well adapted to handling queries of a particular kind. A database system may also process a query relatively slowly if, for example, a relatively large number of users substantially concurrently access the database system. These problems have been addressed using custom indexes into the data. The query or a portion of the query is first applied to the index or to a filter and then the index provides limited number of hits with the database to which the rest of the query is applied.

BRIEF SUMMARY

Methods and systems are described for creating a custom index in a multi-tenant database environment. In one embodiment, a method includes obtaining query for a multi-tenant database that is recommended as a candidate for creating an additional filter, evaluating the query against criteria to determine whether to select the query for creating the additional filter, and creating the additional filter for the query, if the query is selected.

In accordance with embodiments, there are provided mechanisms and methods for creating custom indexes. These mechanisms and methods for creating custom indexes can enable embodiments to provide more reliable and faster execution of queries both in development and in production.

While the present invention is described with reference to an embodiment in which techniques for creating custom indexes are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed. Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 1A is an operational flow diagram illustrating a high level overview of a technique for performing the present invention in an embodiment;

FIG. 4A illustrates an example of data represented in a standard main table for e-mail records in an embodiment;

FIG. 4B illustrates an example of custom two column index table for the data of the example of FIG. 4A in an embodiment;

FIG. 5A illustrates the application of a query to the index table of FIG. 4B in an embodiment;

FIG. 5B illustrates a result of the application of a query to the index table as illustrated in FIG. 5A in an embodiment;

FIG. 5C indicates a result read from a main table using a primary key from the result of FIG. 5B in an embodiment;

DETAILED DESCRIPTION

General Overview

Figure 1B:
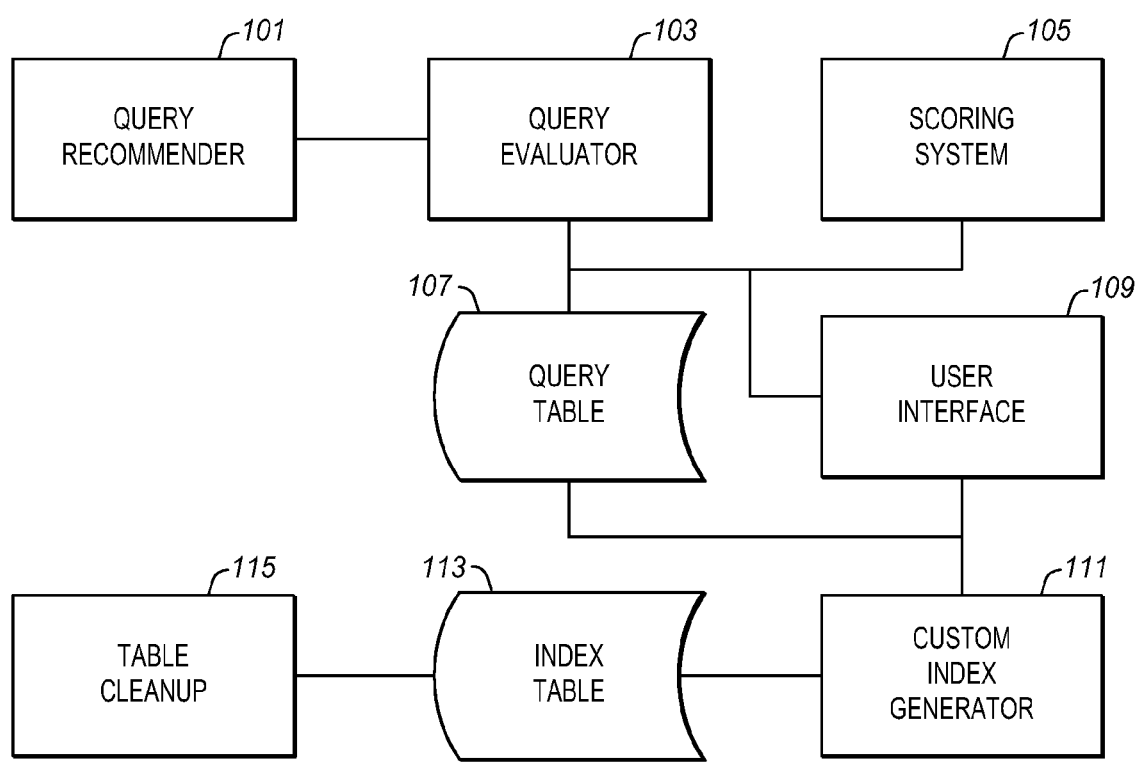
FIG. 1B is a block diagram of components for performing the present invention in an embodiment.

Systems and methods are provided for creating a custom index. These systems and methods are particularly valuable in the context of a multi-tenant database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for creating a custom index will be described with reference to example embodiments.

System Overview

Poorly indexed queries can cause severe performance issues in production when they are run frequently and on large data sets. For some queries the delay in performance may significantly affect the user experience. If a database enforces a time limit on queries, then there may be queries that are too slow to ever be completed. In a multitenant database system, there can be an extremely large variety of different potential queries. Some of the queries may cause negative impacts on the system or provide poor performance for tenant users. A flexible schema and powerful APIs (Application Programming Interface) can create further uncertainty by allowing different users to generate many new and different queries that have never before run on the database system.

Custom indexes are indexes that are created for the use of and on the data of specific organizations or orgs. Unlike standard indexes which exist on all rows of a table, custom indexes exist only for a particular customer. In a multi-tenant database, a particular subset of the rows of the database is assigned to each customer or organization. Other rows are assigned to other customers. An index of all rows will affect all customers. By limiting the index to particular rows, the index can be limited to a particular customer, organization, user group or other subset of all of the data.

Custom indexes can be created manually. For example a designated performance team may find something wrong from AWR (Automated Workload Repository a report provided by Oracle) reports or some other qualitative measure of database performance and then go in and creates an index on the offending org, entity, or field. This is time-consuming if there are a large number of indexes to create. In addition, the performance team may have higher priorities on any one day that will cause the creation of custom indexes to be delayed. In addition, it may be difficult to determine which custom indexes to create. While AWR reports may show, for example, the top 10 poorly performing queries, there may be other queries for which a custom index should be provided. These queries could perhaps be optimized, but are lurking below the superficial view of an AWR report and are never seen.

According to some embodiments of the invention, a tool can be used to identify slow queries and then improve their performance by creating indexes to support the parameters of the query. Using a background process such as a custom index recommender, good candidates can automatically be found for custom index creation. A good custom index recommender can find filters that would be good candidates for an index.

However, such a tool is rarely perfect, so it may not be best to create indexes on every field that the tool recommends. A large number of indexes can be another source of slowing database access and since an index will typically include a copy of the data, it can significantly increase the storage requirements for the database as a whole. To reduce the total number of indexes formulas can be used to check for the best candidates and then create indexes only on those. As a further optional step, once an index is created, a process can be used to go back and check that the indexes being created are being used. If not then they can be flagged and deleted.

Creating Custom Indexes

FIG. 1A shows an example of a process that may be performed to select queries and then to create custom indexes or some other filter to enhance the performance of the selected query. The operations described below may be performed as batch job that run every night that or on any other cycle in series or batches.

In one embodiment, the system first at 102 obtains queries that are suitable for creating a custom index. The queries are ones that have been or are likely to be applied to a part of a multi-tenant database. If a custom index recommender it used, then the system may take all the rows in the custom index candidate table and moves them into a custom index creation table.

Once the candidates are in the custom index creation table, then candidates can be filtered out at 104 to select those for which indexes will be created. There are many different criteria that may be applied for the filtering. One such criterion is the scan size of the query. In other words, a query that scans many rows of the multi-tenant database is a more suitable candidate for a query than one that scans only very few rows. The particular number of rows can be adapted to suit different implementations and different databases.

In one example a scan size greater than 5,000 rows or greater than 25,000 rows or somewhere in between may suffice to satisfy this criterion. The number of rows should be available from metrics on the query. Alternatively, using the recommender tool, this information may be provided by the recommender. The number of rows can be applied to a threshold between 5,000 and 25,000 and if the threshold is exceeded, then the criterion is met.

Data skews are more likely to occur when joining between small tables and large tables. Accordingly, building indexes on small tables can be risky. A selective filter against a small table can still join to a high percentage of the rows in a large table if there is a bad data skew. Therefore the row number criterion is conservative as to the size of the tables and excludes small tables when building indexes automatically.

Another possible criterion is selectivity. This criterion may be combined with the row number criterion and other criteria or used alone. In one embodiment, the selectivity test compares the test count to the test scan size. If this is lower than a threshold, such as 0.1 (10%) then the criterion is satisfied. The particular threshold may be adapted to suit different implementations.

In one embodiment, every candidate gets a score for selectivity. The score may be a ratio of the number of rows available to the number of rows queried factored by the elapsed time for the query. Such a score may be determined in different ways depending on the particular database system and structure. For a Salesforce.com multi-tenant structure the selectivity may be represented by, for example, NVL (SUM ((0.1−(TEST_COUNT/TEST_SCAN_SIZE)) *TOTAL_ELAPSED),0), where 0.1 is a scaling factor, TEST_COUNT is related to the number of rows for the particular organization or customer, TEST_SCAN_SIZE is related to the number of row scanned by the query, and TOTAL_ELAPSED is related to the elapsed time to perform the query. The particular formula may be adapted to suit a particular index recommender and database configuration. Such a score is a measure of the amount of query time that would be saved if the index were built; a selectivity of 0.1, or another number, may be used as the threshold at which the query optimizer considers a custom index to be worth using, instead of a full scan. In some database configurations, a filter with a selectivity of 0.1 may roughly break even if we use an index instead a full scan. In other words, scan with the index may take approximately the same amount of time as a direct scan. While the direct scan reads more rows, the index scan requires the additional step of referring to the index. In such a case, the more the selectivity is below 0.1, the more beneficial the index becomes.

Another criterion is to examine the fields for which the index may be created. There are certain fields that should not have indexes, such as non-deterministic fields, and fields that would require too much complexity, or that span multiple other fields. The custom index described herein requires that data be copied to build the index, although the invention is not so limited, increasing storage requirements. For some fields, however, the index does not speed the operation of the query. In such a case, the index has a cost but provides no benefit.

Another criterion relates to the number of indexes that a particular organization may have approved or allowed. As mentioned above, the custom indexes are for queries that apply only to a particular customer, organization, or other subset of the rows in the database. For this criterion, the number of allowed indexes is checked for the affected, customer, organization, or other grouping. If no more indexes are allowed, then the query is not created. For some organizations, the allowed number of indexes may be zero, in which case, no queries are ever selected.

Additional criteria may also be applied, such as scores and ranks of different factors, frequency of use and more, and at 106, if the criteria are satisfied, one or more queries are selected at 108 for creating a custom index or a filter. The ranking may be made based on the scores obtained in applying the criteria. As an example, a query with a larger number of scanned rows and a lower selectivity will be ranked higher in importance for the scan. Scores from different criteria may be combined in any of a variety of different ways. In one example, the scores are normalized to a percentile and the percentiles are averaged. In another example, the queries are ranked independently for each criterion and the numerical ranks for a query are added to obtain an overall rank. Regardless of the ranking system, the queries may be sorted in descending order and the highest ranked queries selected.

As another alternative, the criteria may be applied 106 and every query that satisfies the query may be selected 108. The threshold for the query may be adjusted to limit the queries that will be selected.

At 110, an index or custom filter is created. In one example, index creation is moved to message queues so that the custom index is enqueued and the creation process is performed at a later and appropriate time.

The number of indexes created in any one day or week may be limited using the selection criteria, such as scan rows and selectivity. This allows indexes to be created even if the recommender is not completely reliable. The recommender may recommend 50-200 indexes, however, by picking the top ranked 5-20, or 2-5, it is more likely that those selected indexes will be good selections.

The particular number of candidates to be used may be adapted to suit different tools, databases, index structures and other formulations. The particular number may be adapted with experience, just as the thresholds for scan size and selectivity can be adapted. So, for example, the system may initially run with low numbers. Then the results may be evaluated to see if the newly added indexes add value. If so then the creation count, in the form of the parameter for the batch job, can be increased. On the other hand, if for some reason the implementation is flawed, the numbers can be lowered, the system can be suspended or in a worse case, the created indexes can be removed or manually dropped.

As mentioned above, each index includes copies of the data from the multi-tenant database. Indexes can be created in any of a variety of different ways, in one embodiment, the multi-tenant data structure is defined having data fields in columns and rows for each of multiple tenants, each row including a data column for a tenant identifier. A first data field with a first data type is defined for a tenant, and a second data field with a second data type is defined for the tenant. The index table is defined with a tenant identifier for the tenant, a copy of data from the first data field and the second data field, and a key to the corresponding rows of the multi-tenant data structure. The index table is then sorted based on the first data field and the second data field.

Performance can be further enhanced and data storage reduced, by monitoring 112 the new custom indexes. After the indexes are created 110 a list can be created to monitor 112 the created additional filter for frequency of use 114 or some other criteria. The created additional filter can then be removed 116 if it is not used more frequently than a predefined number of times in a predefined duration of time.

In one example, a black tab page may be used to store information about created indexes. This can allow reports to be run and other analytics to be performed. The indexes can be scrutinized to check whether created indexes are being used and to provide an alert if they are not. In that case, the index should be dropped. A black tab page can allow for a check for how many indexes were created, how many times they are used, what the buffer gets were before the index was created, what the buffer gets were after the index was created, and more metrics.

FIG. 1B shows a block diagram of a custom index creator in one embodiment, to operate on recommended queries or queries obtained in some other way. Block 101 is a Query Identifier. The Identifier may be a query recommendation tool or any other source or candidate queries for creating a filter. The Query Identifier analyzes queries to identify potential candidate queries. These are queries that might benefit from a custom-index filter. The Query Identifier may identify slow queries or queries that show some other characteristic that would suggest a filter.

The identified candidates are also subjected to a Query Evaluator 103. The Query Evaluator evaluates the candidate queries against one or more criteria and then selects them or ranks them based on the results. Using a row scan criterion, for example, if the query returns a relatively small number of rows, then it can be maintained as a candidate. If the query returns a large number of rows as query results, then the filter may not be selective and it cannot be identified as a candidate for a custom index. This information may be provided by the Query Identifier or it may be generated by the Query Evaluator. The Query Evaluator 103 may be operated as a background process that would run periodically and query the Query Recommender 101 for a list of new queries to evaluate or it may run as a batch process.

The Scoring System 105 may be used to compile a Query Table 107 of custom index candidate queries. This table may include a score for each of the queries presented by the Query Identifier for each query or it may include only the top scoring queries. In addition, bibliographic information about each query may be included, such as the developer, the owner, the organization that uses it, etc. The table provides a convenient searchable storage mechanism for the other components of the system. The table may also be accessed by the Query Evaluator to store results individual results of the evaluations. The data in the table is then accessible to a User Interface 109 and a Custom Index Generator 111.

A User Interface 109 may be provided to allow users to control or review processes that are performed by the system. Thresholds, evaluation criteria, customer preferences and other parameters may be set. In one embodiment, an XML-based report type may be created. This report may be made available to qualified maintenance or query developers to allow the qualified developers to evaluate the created filters for effectiveness and efficiency.

A Custom Index Generator 111 of the system is coupled to the Query Table 107 to generated custom indexes for the top ranked queries. These custom indexes may be provided after they are generated to an Index Table 113 such a black tab page. An administrator can access the Index Table to evaluate the operations of the system and better refine the operational parameters.

Finally, a Table Cleanup 115 coupled to the Index Table 113 may be used to clear out old and seldom used indexes. In one embodiment, the cleanup can be based simply on date information. For example, a filter for any query that has not been run for 6 months could be deleted from the Index Table 103 and from the system.

Figure 1C:
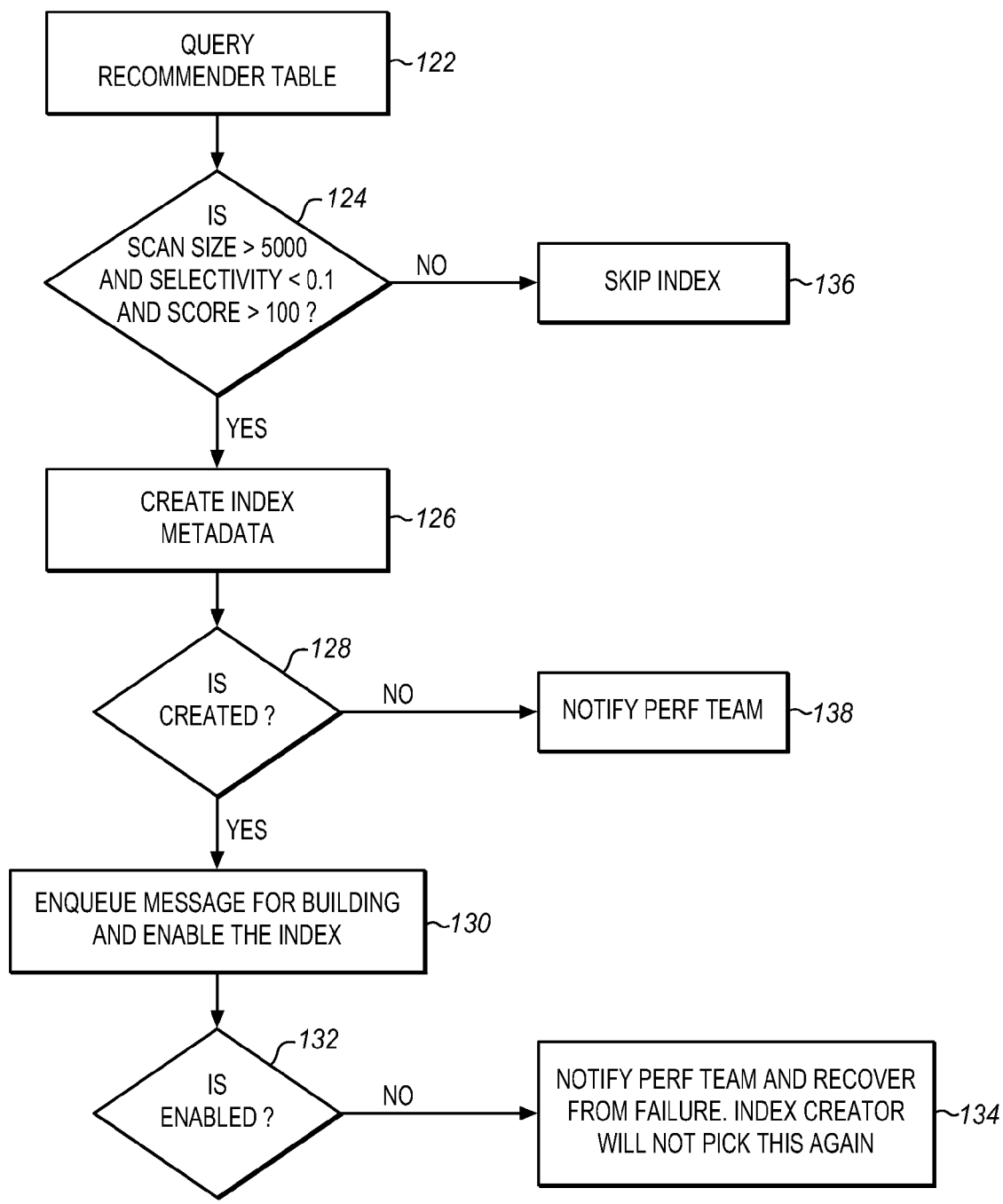
FIG. 1C is an alternative operational flow diagram illustrating a high level overview of a technique for performing the present invention in an embodiment.

FIG. 1C is an alternative view of an operations flow diagram of creating custom indexes according to an embodiment of the invention. A query recommender table 122, contains several queries or pointers to several queries that are recommended for creating a custom index. The recommender may generate the recommendations, receive them from a recommendation tool or in any other way.

At 124, testing criteria is applied to the queries in the table 122. Using a scan size criterion, the system determines whether the scan size is less than 5000 rows. Using a selectivity criterion, the selectivity is less than 0.1. Using a score, the system determines whether the score is over 100. If one of the conditions is not met then the index creation is skipped at 136. On the other hand if all three conditions are met, then index metadata is created at 126. The particular criteria and the numerical thresholds may be adapted to suit different implementations and environments.

The index metadata is tested at 128 after it is supposed to be created. If it cannot be created, then a flag, notification, or alert can be sent to an administrator, such as a performance team at 138. However, if the metadata is created then the message and metadata can be enqueued at 130 with a message for building and enabling the index. At 132, if the index building is enabled, then the custom index is built. Otherwise, at 134, there will be an alert to the administrator or some other record indicating that the system has failed to successfully operate.

Custom Index Overview

1) What is a custom index?

Our application is extremely customizable. We have created indexes in our schema to support all common flows across orgs. Those are standard indices. But once orgs start customizing the app, creating custom fields on standard entities or creating custom objects altogether, their usage is very different from other orgs. So to support that, we need to be able to index the field for just that org. and that is what a custom index is.

A custom index can be created on most standard/custom fields on standard/custom objects. Exceptions can be fields of type Multi-Select Picklists and formula fields.

2) How do I create a custom index?

You need Black Tab permissions to be able to do so. Currently not everyone can create a custom index. When you drill down to the field, you want to create a custom index on, you can click on "Custom Index Statistics (Sampled)" to see if the custom index will be useful in your case or not. Once certain, click on "Add Custom Index" and you have your custom index.

3) How are custom indexes used?

The optimizer runs what we term "Pre-Queries" to improve performance of the main query (at a minimal overhead) where we determine if an index is selective or not. A Custom index is less helpful when comparisons are being done with an operator like "NOT EQUAL TO". A Custom index is less helpful when comparisons are being done with a null value like "Name=" ""Custom index is less helpful when we have an OR clause between 2 filters, which are on 2 different entities, e.g. when we have a filter like Account-.Name like 'Tier3%' or Contact.Name like 'Tier3%'.

4) A former useful criterion for a custom index being selective is 10% up to 333K rows of the total data for an Entity. For example, if ADP has 12M accounts, and we index a custom field "Account_Type". There are 2 users that query against accounts. One user fires off this SOQL (Salesforce Object Query Language):

```
select *
from account
    where account_type = 'Large'.
```

When ADP fires such a SOQL, what goes on in the background, we convert that SOQL to SQL (Structured Query Language)—

```
select *
from sales.account a,
    sales.account_cfdata b /* Custom fields are stored here */
    where  a.organization_id  =  :1  and  b.organization_id  =
:1   and a.account_id = b.account_cfdata_id and b.val20 = 'Large'
```

When we see that val20 is custom indexed, we run a pre-query to see how many rows will come back for the value 'Large'.

```
select count(*)
from core.custom_index_value
    where  organization_id  =  :1  and  key_prefix  =  '001'
/*  Account  */index_num = :2 and rownum <= :3 /* 10% up to 333K
of rows */
```

If the number of rows returned is greater than 333K, even 333,001, the custom index will not be used.

Now let's say another user fires off another SOQL

```
select *
from account
    where account_type = 'Small'.
```

If the pre-query returns less than 333K rows, we will use the custom index.

When a user writes a query like

```
select *
from account
    where account_type = 'Large' and city = 'San Francisco'
```

We double the threshold number to 20% up to 666K rows for each individual filter. This is based on the assumption that the combination of the 2 filters will be more selective, hence we up that threshold limit for using a custom index.

4.1) What about LIKE clauses? Is it beneficial to custom Index. If the SOQL has:

```
select *
from account
    where yim_c = '%sfdc%'
```

We will assess the usefulness of the index based on some sampling of data. Like we will sample the first 100K rows of the table and we find the index is selective, then we will apply that sample to the entire table and use the custom index.

4.2) A current criterion for a standard index being selective is 30% up to 1M rows of the total data for an Entity. For example, if ADP has 12M accounts, and we filter on a field that has a standard index like division—

```
select *
from account
    where division = 'NorthAmericaDiv'.
```

When ADP fires such a SOQL, what goes on in the background, we convert that SOQL to SQL—

```
select *
from sales.account a,
    where a.organization_id = :1 and division = :2
```

When we see that division has a standard index on it, we run a pre-query to see how many rows will come back for the value 'NorthAmericaDiv'.

```
select count(*)
from sales.account
    where organization_id = :1 and division = :2 and rownum <= :3 /*
30% upto 1M of rows */
```

If the number of rows returned is greater than 1M, even like 1,000,001, the standard index will not be used.

5) Custom indexes do work with OR clauses.

The basic rules are that if we have an OR clause, there can be any number of filters OR'ed together, every filter in the OR must be indexed and selective. So in the sql below, all 5 of

```
select *
from account
    where ((Name like :1) OR (Email like :2) OR (First_Name
like :3) OR (Last_Name like :4) OR (Phone like :5))
``` then each field must be custom indexed. (And the sum of the cardinalities (number of rows fetched by applying the filter individually) of the five filters must still be under our threshold.)

6) How do I know if a custom Index is being used?

Search the logs for the following text for the org that you are interested in. Used cust idx Or you can login to the Black Tab, search for the org_id you created a custom index for. Once on the BT page for that specific org, click on "Data Management" under "Administration Setup". Then click on "Custom Indexes" and you will see a list of all custom indexes for that org and their usage.

7) What happens to custom indexes that are not used anymore?

We've yet to do it, but the plan is to run the custom index usage report and then drop the index that has not been used for over 6 months. The reason we'd like to do this is because every custom index created is additional overhead when inserting/updating/deleting data from the object. So we want to keep that to the minimum necessary. In addition there is storage cost involved for us, which we'd like to keep low.

8) What is a two column custom index?

A two column custom index is useful, when a customer is constantly querying with 2 filters or running listviews/related lists such that the first column is always a filter and the second column is being sorted upon. For example, if the user has an Account listview, which has a filter on the State (that is selective), and sorts the data based on City, we can create a two column custom index on State, City. The first column in the index should be the one being filtered upon and not the one that is being sorted on.

Recommending Custom Indexes

To validate the performance of a query, the query is first captured in some way. In the present description, the queries are directed to a multi-tenant database. However, the approaches described herein can also be applied to other types of databases. A query indexing system can be hooked into a complete test and validation system or into a database management system in several different places. Any one or more of these places or other places can be used to identify query run-time problems.

In one example, queries submitted in production, that is queries submitted by users are monitored. If a particular query runs slowly, or has slow performance, then it is flagged for later analysis. This analysis can include applying the tests and comparisons disclosed herein. Such an analysis after a query has already been applied allows a database system to be improved in a separate process without interfering with the use of the database. The improvements may include analyzing metadata and query formulation. Queries can be identified using a timer, using a time out log, or using a progress log.

Figure 2A:
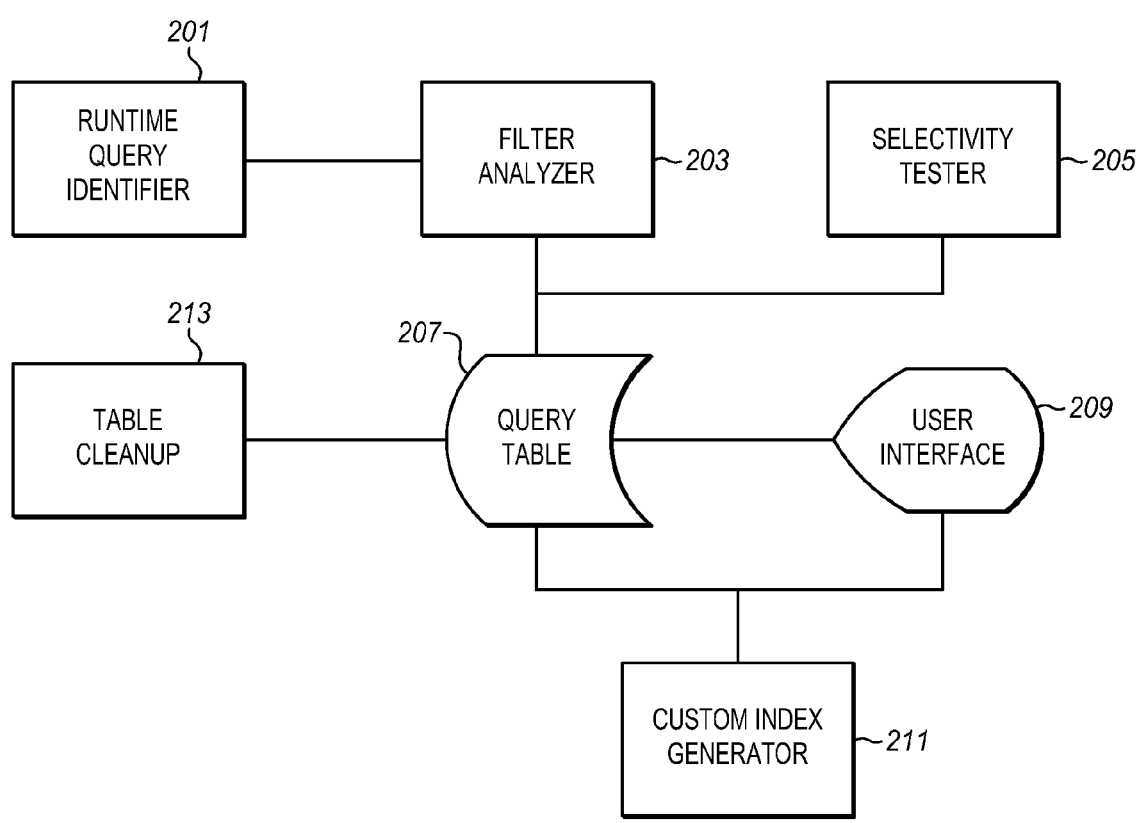
FIG. 2A is a block diagram of components for determining candidates for a custom index for the present invention in an embodiment.

FIG. 2A shows a block diagram of a custom index recommender in one embodiment, to operate on incoming queries. Block 201 is a Runtime Query Identifier. The Identifier analyzes the running time of queries to identify potential candidate queries. These are queries that might benefit from a custom-index filter. The Query Identifier is able to identify slow queries with potentially selective filters on unindexed but indexable columns of the database. If the query took a significant amount of time to run (for example, more than 30 seconds, depending on the particular embodiment, then it may be considered a candidate. The Identifier may also handle queries that time out. When a query times out, the database connection is cancelled and it can no longer write/commit to the database. These queries can be identified by observing behavior or be performance summary list from the database or an application running on the database. The list can then be parsed to generate a list of candidate queries.

The identified candidates are also subjected to a Filter Analyzer 203. While the Query Identifier 201 is shown as operating before the Filter Analyzer, the order of operations may be reversed. If the query returns a relatively small number of rows, then it can be maintained as a candidate. If the query returns a large number of rows as query results, then the filter may not be selective and it cannot be identified as a candidate for a custom index. The Filter Analyzer can check to see the query has identified any potentially indexable filters. In one embodiment, all of the filters in the query can be inspected to see if they can be optimized. We can also take note of any filters that cannot easily be optimized, but that could be custom indexed and that could be modified to work with the custom index.

The Selectivity Tester 205 may be used to compile a table 207 of custom index candidates. This table may include an identifier for each query, the filters that the query uses and other information about the query. For example, the filter analyzer 203 may determine the operators and data types for the query. These may be included in the table. In addition, bibliographic information about each query may be included, such as the developer, the owner, the organization that uses it, etc. The table provides a convenient searchable storage mechanism for the other components of the system. The table may also be accessed by the filter analyzer to store results of the analysis. The data in the table is then accessible to a User Interface 109 and a Custom Index Generator 211.

The Selectivity Tester 205 may be operated as a background process that would run periodically and query the custom index candidate table 207 for a list of new filters to test. For each filter, it would run a query against the database to test the selectivity of the filter; this test query may be a sampled query rather than a complete query of the entire database. Exact selectivity information may not be required and scanning the full table for a large organization may be quite expensive. The selectivity test then provides a selectivity estimate that may be recorded in the custom index candidate table. Alternatively, a sampled query may be used to develop an initial estimate and then certain queries may be selected for a detailed or full query based on the estimate.

A user interface 209 may be provided to allow users to control or review processes that are performed by the system. The user interface may allow access to the custom index candidate table and to the selectivity testing process. In one embodiment, an XML-based report type may be created. This report may be made available to qualified maintenance or query developers. The report type may be used to allow the qualified developers to query the custom index candidate table, with all of the filtering, grouping, etc. functionality available in reports. In one embodiment, the user interface may allow the developer to command the generation of a custom index for any of the queries in the report. The command may be received and acted upon by the Custom Index Generator 211 coupled to the User Interface. Links in the output could be used that would allow the developer to create custom indexes easily from the results view. The links may be configured to lead to another user interface that allows the developer to set the parameters and control each specific custom index that is generated for a query. Alternatively, the Custom Index Generator 111 of the system may use the data in the table to make autonomous automatic decisions about generating a custom index.

Finally, a Cleanup module 213 may be used to clear out old data. In one embodiment, the cleanup can be based simply on date information. For example, any rows from the custom index candidate table that hadn't been touched in 6 months could be deleted. For another example, any query that had not been run for 6 months could be deleted from the Query Table 207.

Figure 2B:
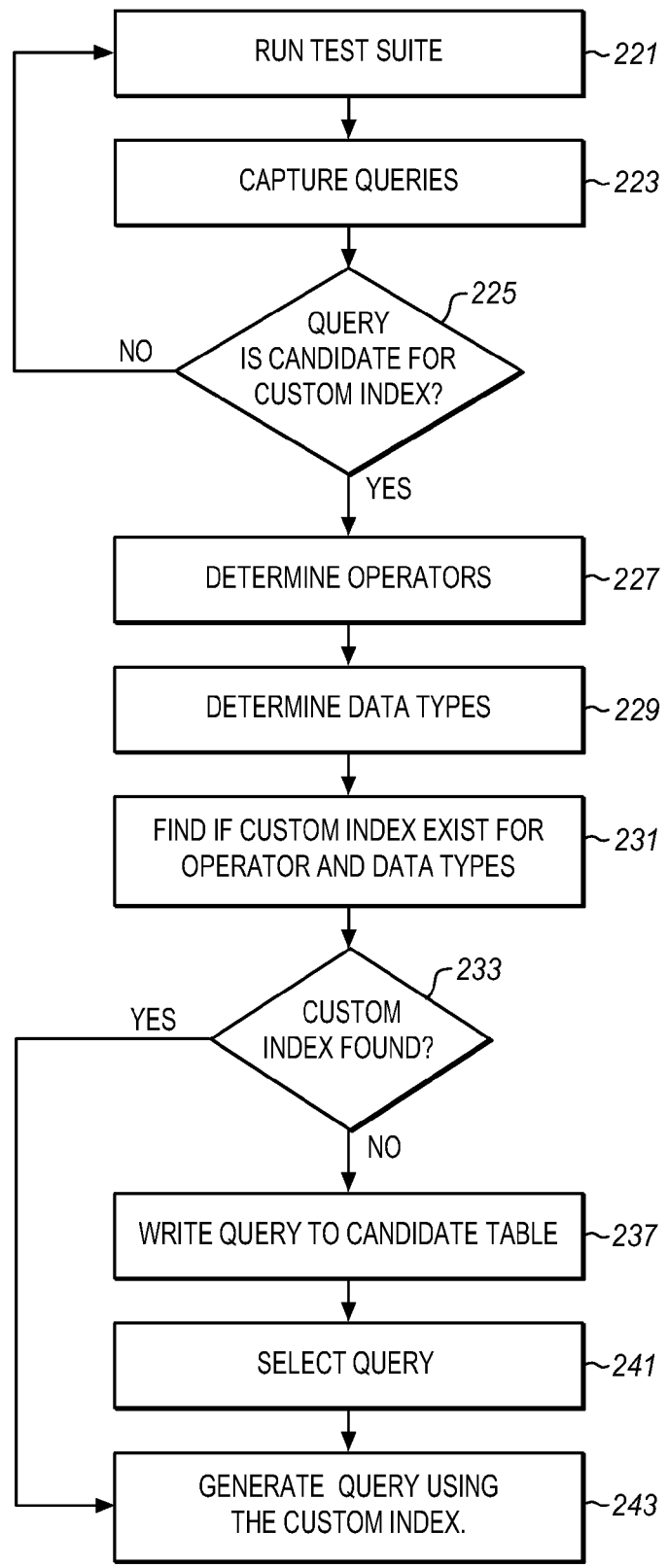
FIG. 2B is an operational flow diagram illustrating a high level overview of a technique for determining candidates for a custom index for the present invention in an embodiment.

FIG. 2B shows a process flow diagram of an embodiment of the invention. The process may be performed by the architectural blocks of FIG. 1B and FIGS. 5 and 6. Not all of these operations are necessary and additional operations may be added, if desired. At block 221 of FIG. 2B, an automated test suite runs a variety of different operations including running a varied set of logical queries. The automated test suite can perform many different functions to exercise the databases and to check user interfaces and applications. As an alternative, as mentioned above, there can be other sources of queries, such as user input, outside applications, maintenance systems, etc.

At block 223, the recommender system captures one or more of the queries. As mentioned above, the queries, can be captured before, during, or after execution. A variety of different criteria can be used to determine which queries to capture, or all of the queries can be captured. In an automated test suite application, all of the queries can be captured before execution without interfering with use of the underlying database. The queries may be in a variety of different formats, depending on the nature of the database and its supporting infrastructure. In the example described above, only slow queries or queries that filter poorly are captured.

At block 225, the query is analyzed to determine whether it is a candidate for a custom index. In one example, the query is a candidate if it runs slowly or if it times out. Additional criteria may also be used such as whether the query uses a filter or whether the query is used frequently and applies to a large database. In another example, the performance of the query can be measured as compared to other queries and queries that are inefficient may be selected.

The measure of performance or execution duration can be compared to the size of the organization that is using the query. If the query is being used by a large organization or an organization that has a large quantity of stored data in the database to which the query may be applied, then the query may be allowed more time to run. Alternatively, if the query is being applied to a smaller dataset, then it should be expected to run more quickly. The duration or performance of the query can be scaled by the size of the dataset. In one example, a ratio or scaling factor can be developed based on the size of the dataset or the size of the organization. This can be applied to any performance measure when determining whether the query is a candidate for a custom index.

In the analysis, the query may be run against a portion of the database to monitor its performance. Such a run may be done to test the selectivity of the filter of captured query and to develop a selectivity estimate for the captured query. These estimates may be compared to those for other queries to aid in determining which queries to select.

At block 227, the query is analyzed to determine the operators that it uses. Additive and comparative operators can be tabulated or listed. For use in determining whether to generate a custom index, operators that benefit from such an index can be tabulated. A query that has a large number of such operators is a better candidate than one does not. For example, if the query uses primarily negative operators, then it may not benefit from a custom index and it may be discarded as a candidate.

At block 229, the data types affected by the query are analyzed. This may include the columns used by the captured query, where the columns indicate the data field or the nature of the data. This may also include the rows used by the captured query, where the rows indicate organization, profile, or user. The data collected at operations 227 and 229 are useful for determining whether the query is a good candidate and are also useful when generating a custom query. All of this data may be stored in a query table or a custom index table or in any other suitable location and format.

At block 231, the filter and indexes used by the query are analyzed. In addition, an analysis is performed to determine if filters already exist for the identified operators and data types. At block 233, if a current index already exists and it is suitable for use by the query, then the query may be modified at block 233 to use the current index.

At block 237, the candidate query is written to the Query Table 207. When it is time to write a custom index, at block 241, the query is selected and at block 243, a custom index is generated based on determined operators, data types, and determined current filters.

The accuracy of a custom index can be improved by actually measuring the performance of a query after the custom index is generated and then comparing that to the original performance. The performance of a query can be measured and logged for later reference. The second execution can also be measured and compared to the first run to determine whether the query's performance has been improved and whether additional measures should be taken.

As additional operations to improve the functionality of the query it can also be analyzed and optimized for performance. Any queries with problems can be provided as an output to developers to inspect and correct the problems. The correction may include hint changes, database statistic changes, and SQL changes to the queries, among others.

Custom Indexes

A multi-tenant database client may desire to run frequent API (Application Programming Interface) queries with a filter on one column and a sort on another column, returning just the first few rows or, for example, only new rows. Such a query might traditionally need to scan 1000 rows or more and sort the data on each query to find the first few rows.

One way to avoid sorting or scanning all of the rows is to use a composite standard database index. This avoids a second sorting operation, but may introduce a large maintenance overhead in a multi-tenant system because the index must be maintained for all tenants' data. Another way is to join more than one custom index together for purposes of executing the query; however this will still require a sort operation because sort ordering is generally not preserved when two indexes are joined together. However, related lists with sorts can be slow when a parent object has many related child objects. Queries that sort through related lists can also use a sort and rownum (number of rows to sort) limit to reduce the delay, but this can affect the result.

To answer such queries efficiently, a two column custom index can be used. In one embodiment, platform objects, such as tables with rows and columns, are provided that give list views with filters on a first parameter, for example CommunityId and sorts on a second parameter, such as date or score. The second column may be used for dependencies, cascade deletes, or any other useful parameters. Two column custom indexes, as explained below, may be more efficient than composite indexes and custom index joins for evaluating filters on two parameters because the index ordering may be used in order to avoid a sort operation.

Figure 3:
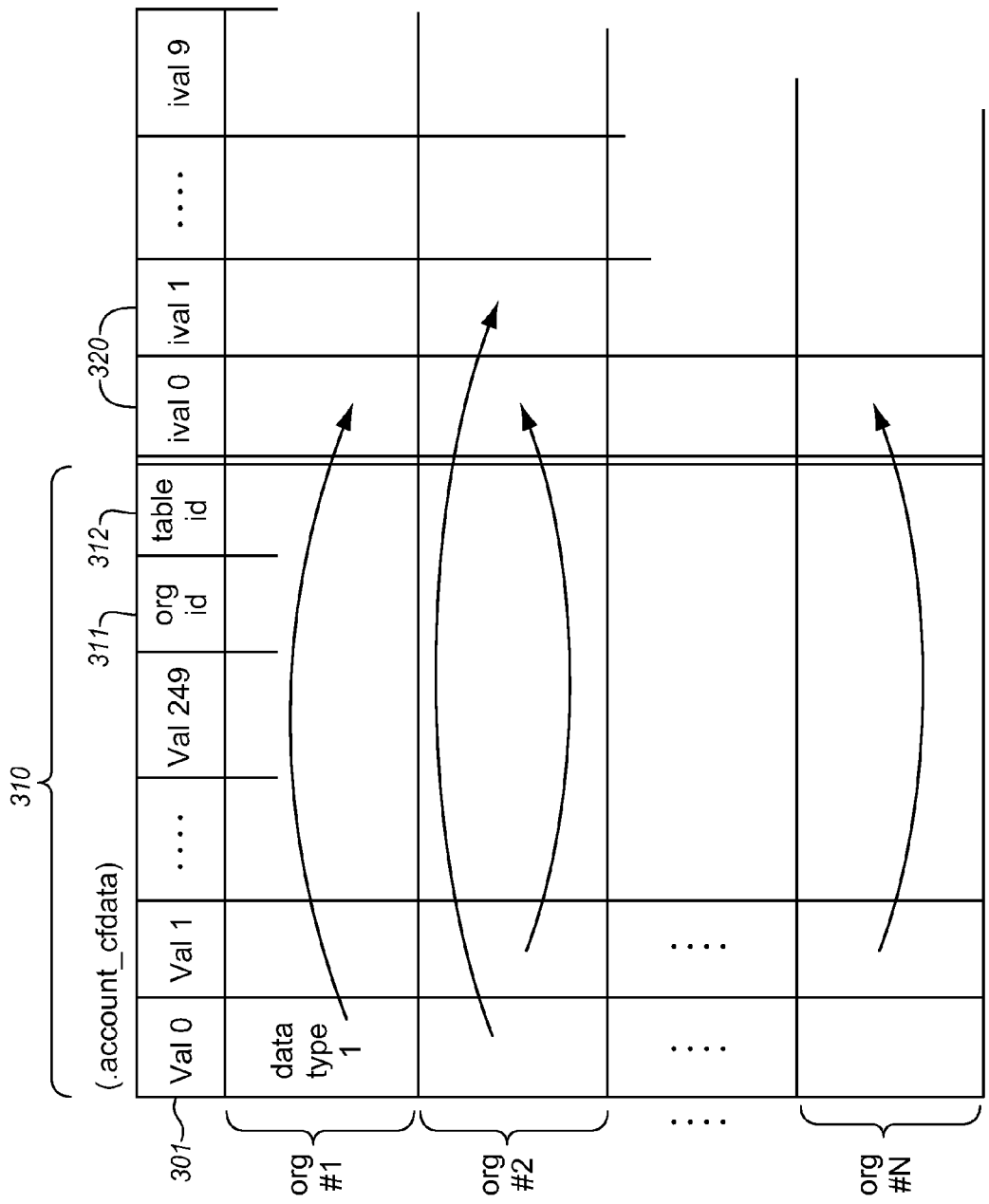
FIG. 3 illustrates a custom object represented as a custom field table including physical index columns in an embodiment.

FIG. 3 illustrates an example of a custom object represented as a custom field table 310 including physical index columns 320 according to one embodiment. In one aspect, each custom field data table contains multiple (e.g., 10, 100, 250, etc.) physically indexed columns 320, e.g., using standard Oracle B*Tree indexes. In an example with 10 indexed columns, an administrator can therefore designate up to 10 custom fields, of string or date types, to be indexed. When a custom field is flagged for indexing, the data in the original column (which is still maintained to display the unmodified format to the user when necessary) is copied to one of these indexed columns, although separate tables can be used. For example, as shown in FIG. 3, custom data field 301 "val0" was flagged by the system administrator for organization 1 as an indexed custom column. Data from this flagged column is copied to the index column "ival0". Similarly, custom data field "val1" was flagged by the system administrator for organization 2 as an indexed custom column, and the data from this flagged column is copied to index column "ival0". At some later time, the system administrator for organization 2 may have flagged another custom field column and the data for this column is copied to another index column (e.g., column "val0" data copied to column "ival1" as shown in FIG. 3). In one aspect, similar to the custom fields, the lowest numbered index columns are preferably used or filled first.

Organizations that choose not to use indexed custom fields will have null values in these fields, and Nulls do not take up any space in the indexes. In this manner space is used up in the database only as custom columns are actually indexed. Also, index columns 320 are preferably stored in the corresponding custom field table, however, they may be stored out of row, in which case it is preferred that the org id 311 and table id 312 columns be copied to the separate indexed column table to facilitate searching.

The two-column index is explained below in the context of a particular example. FIG. 4A shows an example simple data set in a table similar to the generalized table of FIG. 1. In this FIG. a set of e-mails are represented using custom fields. However, depending on the application e-mail data may be a standard, not a custom field.

In this example, an identifying column 401 provides an identification of the tenant for which e-mails have been stored in the database. This general information column 401 may be supplemented with additional columns providing keys, account information, pointers to other identifiers, etc., depending on the application. The custom field columns 410 provide information about the e-mails. The particular columns shown are for illustration purposes. More or fewer columns may be used depending on the nature of the e-mail system and the level of record-keeping that is desired.

In the present example, email_id 420, provides a unique identifier for each row. to_address 430 provides the destination of the e-mail message for each row. The same or additional columns may be used for additional addressees, when appropriate. from_address 440 provides the source for each row date 450 provides the data that the message was sent. More accurate timing information may be stored in the same or additional column if desired. Subject 460 and body 470 are taken directly from the text of the e-mail size 480 and status 490 and provide statistical information about the e-mail.

FIG. 4B provides an example of how one aspect of the e-mail table may be indexed. The particular columns to be indexed can be selected to suit the particular custom fields and the preferences of a particular tenant, customer, organization or user. The index table reproduces some of the fields in the main data table of FIG. 4A. The tenant id column 401 is carried over from the data table. The entity column 404 identifies the table that is indexed as the e-mail table or the e-mail portion of a set of custom fields. The index number column 406 provides the index number and the primary key column 422 provides a key to the email_id column 420 of the e-mail table. The table also has two data rows, val1 432 and val2 452. The first index column corresponds to the to_address 430 and the second value corresponds to the date 450 of the e-mail table.

The index table, not only provides an index into the data but can also be sorted, based on any one or more particular fields. In the example of FIG. 4B, the table is sorted by tenant id, then by entity, then by index number, then by val1, and then by val2. This cannot be seen in the sort order of such a small set of data, however, it can be seen that the table is sorted by tenant id and by val1, the first index column. As a result, for any particular tenant, a query can go directly to the relevant portion of the index table. Additional index tables may be provided that are sorted based on any of the other columns in any sort order in order to enhance the speed with which other queries may be performed using an index table.

FIGS. 5A-5C show how e-mail data might be looked up using a query and the index table. Typically, using a single column index, a query would first go to a single column index table. Consider, for example, that the query is for the most recent e-mail from "jesse@email.com." In this case, the query can a) look op the rows corresponding to tenant 1 in the index table, b) identify those rows for index number 1, and c) identify those rows where the index value is jesse@email.com. If the index table is designed for such queries, then these rows will be sorted in this order and the desired rows will be next to each other. The query can then d) use the primary keys for the identified rows to access the main database and read out the desired data.

The database data can then be e) sorted by date and f) the most recent row can be identified as the result of the query. Such a process provides a result for a query for the most recent e-mail for "jesse@email.com." In this process every e-mail for "jesse@email.com" was accessed in the main database must be accessed in the main database table.

In the example beginning with FIG. 5A, there are two indexed columns and the index table is sorted based on both indexes. To answer the same query, the query can a) look up the rows corresponding to tenant 1 in the index table, b) identify the rows for index number 1 in the index table, c) identify the rows where "jesse@email.com" is the first index value in the index table, and d) identify the last row which, based on the sort order, has the most recent date. The identified row from the index table is shown in FIG. 5B. This row identifies the data in the main database but does not contain all of the desired data.

The query can then take the primary key "9" for the identified row and e) read that row from the database. An example portion of the data for this row is shown as FIG. 5C. This is the extracted data from the main database. In this example, with the two column index table, the query accesses only a single row from the database, instead of five rows. In addition, the query does not sort the rows from the database, but uses the pre-sorted index table values to perform the same function. As a result, the query can be processed faster and less access to the main database is required to answer the same query.

Hardware System Overview

Figure 6:
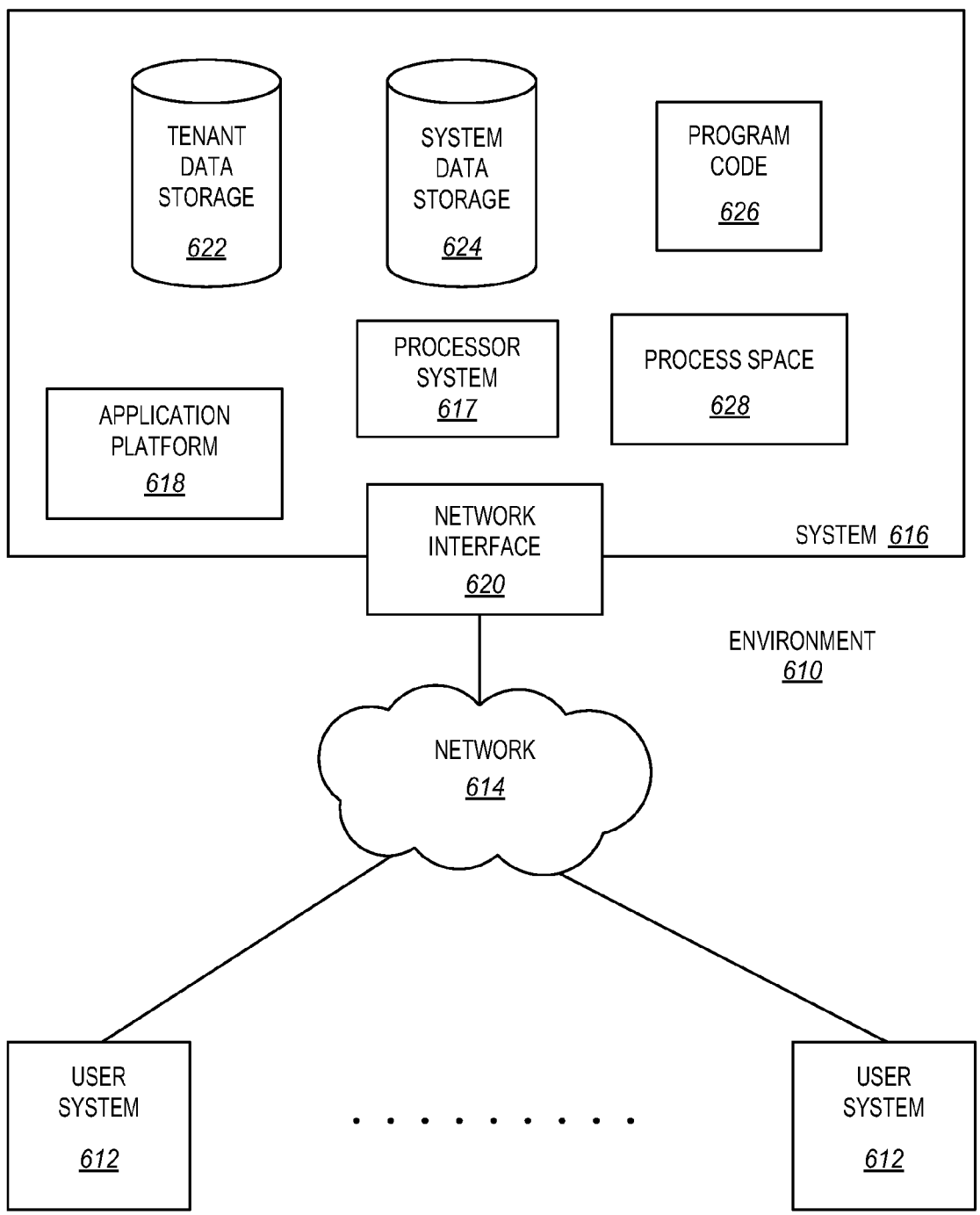
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
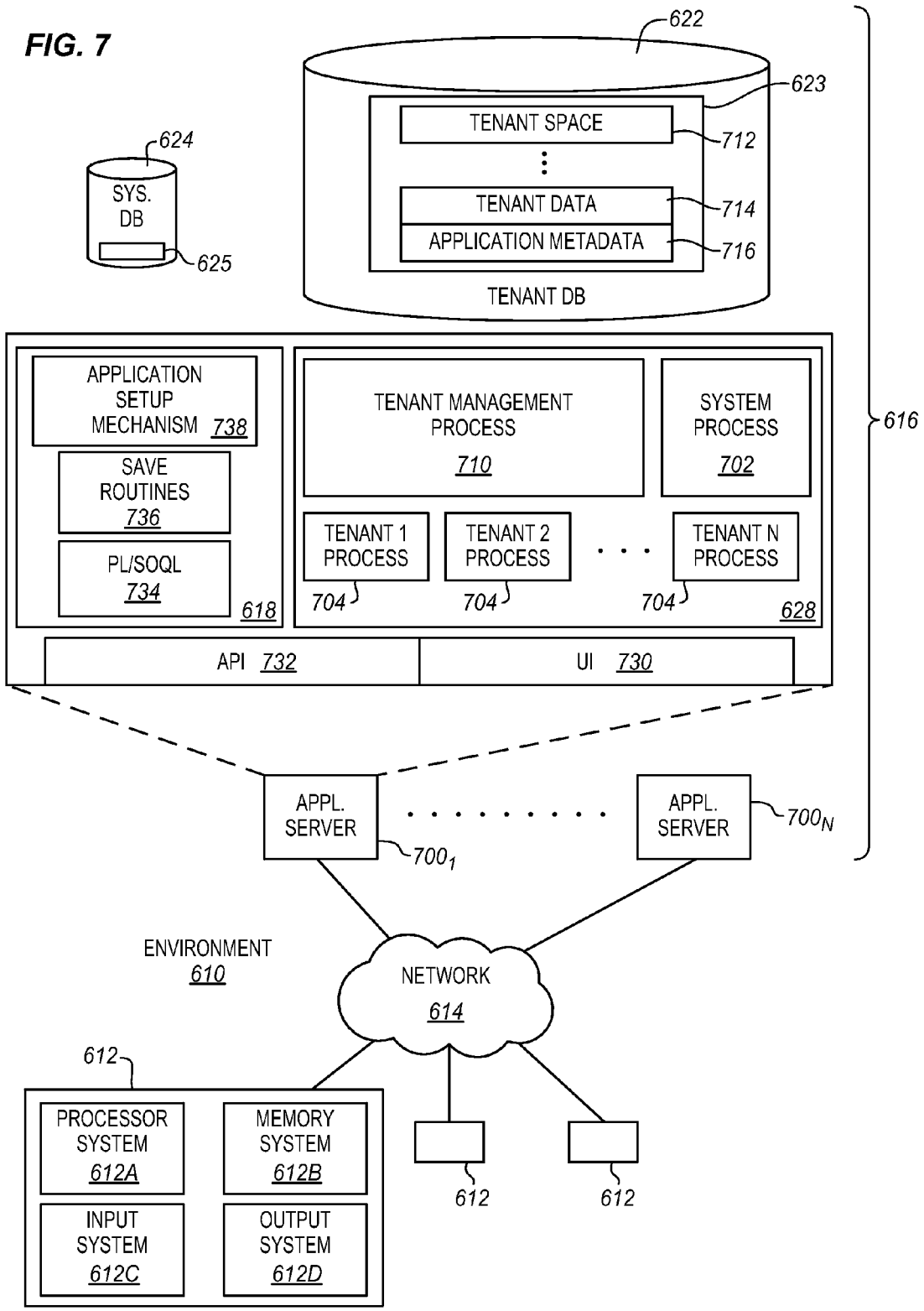
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 10001-1000N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
monitoring queries that are applied to and running on a database;
flagging at least some of the monitored queries that run more slowly than others of the monitored queries as each being recommended as a candidate query for creating an additional filter to enhance the performance of the respective query;
evaluating the candidate queries against criteria in a background process, wherein a first of the criteria is a score for selectivity, the score being a ratio of a number of rows available to the query within the database to a number of rows queried from among the available rows multiplied by a scaling factor based on the elapsed time for the query;
ranking the candidate queries based on the evaluating;
selecting a candidate query based on the ranking from the evaluating;
utilizing a message queue structure to enqueue custom index creation to be performed at a later time; and
creating the additional filter for the selected candidate query using copies of data from the database as an index table for use by the selected query when running on the database, wherein the additional filter is to limit the selected query to a subset of rows of the database contained within the index table.

2. The method of claim 1, wherein a second of the criteria is scan size and wherein evaluating the candidate query comprises determining how many rows of the multi-tenant database are scanned by the candidate query and wherein selecting comprises selecting the candidate query if the number of rows exceeds a threshold.

3. The method of claim 1, wherein the selectivity criteria include determining how selective the candidate query is in scanning rows of the database and wherein selecting comprises selecting the candidate query if the number of rows and the selectivity score exceed thresholds.

4. The method of claim 3, wherein a third of the criteria is run time and wherein evaluating the candidate query comprises determining how much time the candidate query takes to run in the multi-tenant database and wherein selecting comprises selecting the candidate query if the number of rows, the selectivity, and the run time exceed thresholds.

5. The method of claim 1, wherein flagging comprises receiving a ranked set of queries and selecting a subset of the queries that have the highest rank.

6. The method of claim 5, wherein flagging comprises flagging a plurality of queries from the subset of the queries based on evaluating the queries of the subset of queries.

7. The method of claim 5, wherein selecting comprises selecting a subset of highest ranked queries for creating an index.

8. The method of claim 1, wherein creating the additional filter comprises
defining an index table including a tenant identifier for a tenant, a copy of data from a first data field having a first data type, a copy of data from a second data field having a second data type, and a key to the corresponding rows of the database; and
sorting the index table based on the first data field and the second data field.

9. The method of claim 1, further comprising monitoring the created additional filter for frequency of use and removing the created additional filter if it is not used more frequently than a predefined number of times in a predefined duration of time.

10. A non-transitory machine-readable medium carrying one or more sequences of instructions for creating custom indexes in a database, the database being a multi-tenant database system, which instructions, when executed by one or more processors, cause the one or more processors to carry out the steps of:
monitoring queries that are applied to and running on a database;
flagging at least some of the monitored queries that run more slowly than others of the monitored queries as each being recommended as a candidate query for creating an additional filter to enhance the performance of the respective query;
evaluating the candidate queries against criteria in a background process, wherein a first of the criteria is a score for selectivity, the score being a ratio of a number of rows available to the query within the database to a number of rows queried from among the available rows multiplied by a scaling factor based on the elapsed time for the query;
ranking the candidate queries based on the evaluating;
selecting a candidate query based on the ranking from the evaluating;
utilizing a message queue structure to enqueue custom index creation to be performed at a later time; and
creating the additional filter for the selected candidate query using copies of data from the database as an index table for use by the selected query when running on the database, wherein the additional filter is to limit the selected query to a subset of rows of the database contained within the index table.

11. The medium of claim 10, wherein a second of the criteria is scan size, wherein the second of the criteria is selectivity, wherein evaluating the candidate query comprises determining how many rows of the multi-tenant database are scanned by the candidate query, determining how selective the candidate query is in scanning rows of the multi-tenant database, and wherein selecting comprises selecting the candidate query if the number of rows and the selectivity exceed a threshold.

12. The medium of claim 11, wherein flagging comprises receiving a set of queries ranked by runtime and selecting a subset of the queries that have the longest runtime.

13. The medium of claim 12, wherein flagging comprises excluding queries that include a null value from the selected queries.

14. An apparatus for creating custom indexes in a database, the database being a multi-tenant database, the apparatus comprising:
a hardware processor; and
one or more stored sequences of instructions which, when executed by the processor, cause the processor to carry out the steps of:
monitoring queries that are applied to and running on a database;
flagging at least some of the monitored queries that run more slowly than others of the monitored queries as each being recommended as a candidate query for creating an additional filter to enhance the performance of the respective query;

evaluating the candidate queries against criteria in a background process, wherein a first of the criteria is a score for selectivity, the score being a ratio of a number of rows to the query within the database to a number of rows queried from among the available rows multiplied by a scaling factor based on factored by the elapsed time for the query;

ranking the candidate queries based on the evaluating;

selecting a candidate query based on the ranking from the evaluating;

utilizing a message queue structure to enqueue custom index creation to be performed at a later time; and creating the additional filter for the selected candidate query using copies of data from the database as an index table for use by the selected query when running on the database, wherein the additional filter is to limit the selected query to a subset of rows of the database contained within the index table.

15. The apparatus of claim 14, wherein the step of creating the additional filter comprises:
   defining an index table including a tenant identifier for a tenant, a copy of data from a first data field having a first data type, a copy of data from a second data field having a second data type, and a key to the corresponding rows of the multi-tenant data structure; and
   sorting the index table based on the first data field and the second data field.

16. The apparatus of claim 15, wherein the index table is comprised of columns in a multi-tenant data database.

17. The apparatus of claim 15, wherein the index table is a separate data structure from the database.

18. The apparatus of claim 15, wherein one of the first data field and the second data field indicates a time.

19. The apparatus of claim 18, wherein the index table further comprises an index field.

* * * * *